March 2, 1926.  
N. H. FOOKS  
1,575,196  
APPARATUS FOR HEAT TREATING SUBSTANCES PACKED IN SEALED RECEPTACLES  
Filed Feb. 12, 1925
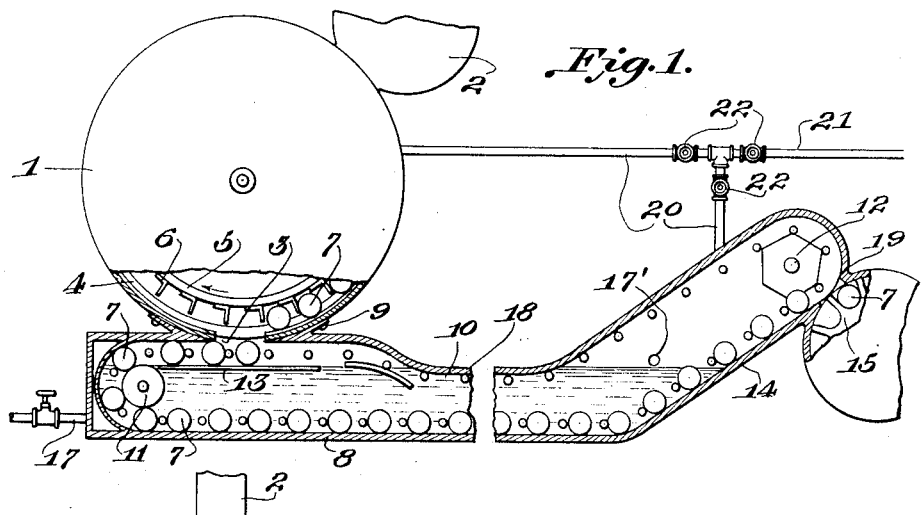
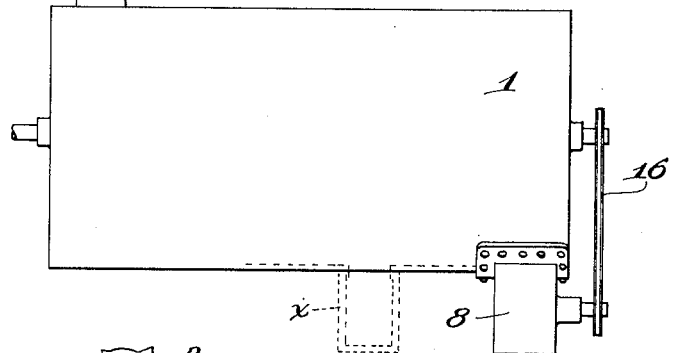
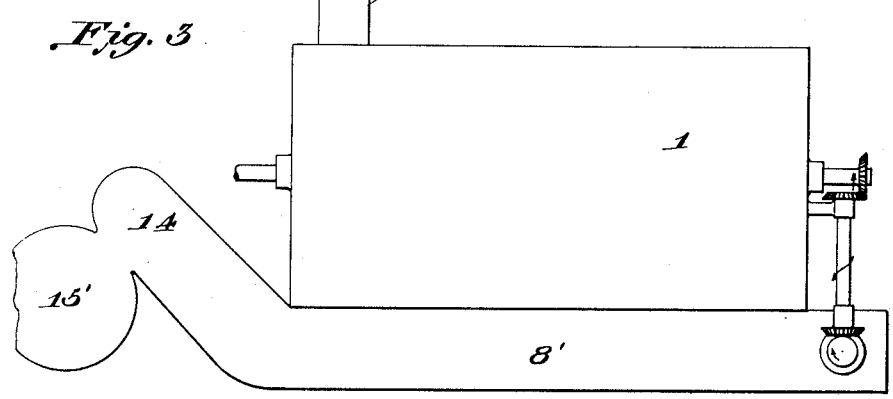
Inventor  
Nelson H. Fooks.

Patented Mar. 2, 1926.

1,575,196

UNITED STATES PATENT OFFICE.

NELSON H. FOOKS, OF PRESTON, MARYLAND.

APPARATUS FOR HEAT-TREATING SUBSTANCES PACKED IN SEALED RECEPTACLES.

Application filed February 12, 1925. Serial No. 8,841.

*To all whom it may concern:*

Be it known that I, NELSON H. FOOKS, a citizen of the United States, residing at Preston, in the county of Caroline and State of Maryland, have invented certain new and useful Improvements in Apparatus for Heat-Treating Substances Packed in Sealed Receptacles; and I do hereby declare the following to be a full, clear, and exact description of the invention, such as will enable others skilled in the art to which it appertains to make and use the same.

This invention relates to an improved apparatus for heat-treating substances packed in sealed receptacles, such as tin cans, and it particularly relates to apparatus designed to carry out the process set forth in my Patent 1,491,903, dated April 22, 1924. In this patent I have disclosed a method and apparatus for successively heating and cooling food packed in sealed receptacles by passing the latter through a heating medium consisting of steam and then through a body of cooling water which the steam overlies.
The apparatus disclosed therein includes a retort or tank divided by a partition into two chambers—a cooking chamber and a cooling chamber—the chambers being in communication over the top of the partition.
The present invention aims to improve on the apparatus disclosed in said patent whereby to make the process therein disclosed more efficient in operation and to simplify the apparatus. Generally stated, the present invention embodies a water tank external to a cooker of the type employing a fixed helical can path with which cooperates a reel for moving the cans from the inlet end of the cooker to the outlet end thereof, the water tank being disposed below the cooker and in direct communication therewith through an outlet opening in the bottom of the cooker whereby as the cans reach the said outlet opening they pass to the water tank, through the same, and then out to the atmosphere. This arrangement of cooker and cooler is admirably adapted to pressure cooking in steam and cooling in water inasmuch as interchange of heat between the steam and cooling water is reduced to a minimum by the arrangement indicated. Various other features of novelty and invention will appear as the description proceeds in connection with the accompanying drawings forming part of this specification.

Referring to the drawings:

Fig. 1 is a side elevation partly in section of the improved combined cooker and cooler.

Fig. 2 is an elevational view of the apparatus looking at the broad side of the cooker, the dotted lines indicating an alternative location of the cooler.

Fig. 3 is an elevation view showing the cooler as arranged longitudinally of the cooker.

In the drawings, 1 indicates the shell of the cooker, circular in cross-section, and provided with an inlet 2 and an outlet or exit 3 at its bottom for the canned goods which have passed through the cooker. Within the shell and suitably secured against its wall is a fixed rail 4, this rail extending in a helical path throughout substantially the length of the shell and forming one member for progressing the cans or receptacles through the cooker. Cooperating with the helical rail 4 is a reel 5 having a series of longitudinally extending angle irons 6 so disposed with respect to the rail 4 that the cans 7 to be progressed through the cooker will be directed along the helical path formed by the rail 4, as will be readily understood, this type of construction being well-known in the art. A water tank 8 having an opening in its upper surface is coupled to the cooker in any suitable manner as indicated at 9, the water tank being preferably rectangular in cross-section. Arranged within the water tank is an endless conveyor 10, the same being looped over pulleys 11 and 12 at the ends of the tank. This conveyor is so arranged that a portion of its length passes across the passageway or opening between the cooker and the tank to permit the cans 7 passing through the opening 3 in the cooker to be received by the conveyor. A platform 13 is disposed below that portion of the conveyor which passes beneath the opening 3 so that the cans received by the conveyor may rest thereon, it being understood that the cans are received into the open spaces formed by the links of the conveyor. After the cans have been received by the conveyor, they are carried away from the opening 3, around the pulley 11, along the bottom of the tank through the water therein, and up the inclined end 14 of the tank above the level of the water, and are discharged through a suitable rotary valve 15 at the upper end of the tank. The conveyor is synchronized with the cooker reel in any suitable manner, as by means of the driving belt indicated at 16, in Fig. 2.

Cooling water is supplied to the tank 8 through any suitable conduit 17, and the tank is kept full of water up to the waste pipe 17' in the tank. The cooker is preferably a steam cooker and the steam will be maintained under such pressure as is necessary to effect proper cooking of the goods to be treated. Inasmuch as the water tank is in open communication with the cooker, it follows that the pressure within the cooker will also act on the water within the tank and that there will be some interchange of heat between the steam and the cooling water. When the water tank is of considerable length, it is desirable to limit the area of water which is in direct contact with the steam from the cooker, and to this end the top of the tank may be depressed for a portion of its length as at 18 to form a seal against the passage of steam to the far end of the tank. However, as the discharge end of the tank extends upwardly for the purpose of elevating the opening 19 to the valve 15 above the level of the water, it is necessary to provide means for counterbalancing the pressure of the steam exerted by the steam in the cooker. This may be accomplished by providing a conduit 20 between the cooker and the upwardly extending end of the tank whereby the same pressure may be maintained in the upwardly extending portion of the tank as in the other parts thereof. Instead of utilizing steam direct from the cooker for this purpose, the same result may be accomplished by supplying compressed air to the upper end of the tank through the conduit 21, suitable valves 22 being provided to permit the use of compressed air or steam as will be readily understood.

It will now be seen that I have provided a very simple form of apparatus which will permit the canned goods to be passed directly from the cooker to a cooler, the cooling liquid being under the same pressure as the heating medium. It will, of course, be understood that considerable internal pressure within the cans is generated as they are passed through the high pressure cooker. By passing the cans directly from the cooker to the cooler and maintaining the same under external pressure while they are being cooled, the likelihood of the cans springing their seams or bulging their ends is entirely eliminated.

In Fig. 2 I have shown the cooler arranged at the extreme end of the cooker. However, it may be pointed out that if it is desired to shorten the length of the cook the cooler may be placed at any suitable point intermediate the ends of the cooker; for example, as indicated in dotted lines $x$ in Fig. 2, it being understood that the bottom of the cooker will be provided with a suitable discharge opening to permit the cans to pass out of the cooker at the desired point. It will be further understood that when the cooler is moved over to its new position suitable extension of the driving mechanism for the conveyor will be provided, and also that suitable closure means for the discharge opening not used will be provided.

In Fig. 3 I have shown the cooling tank 8' as arranged longitudinally of the cooker instead of transversely thereof as in the preferred form. The combination, however, is substantially the same as when the cooler is arranged transversely of the cooker as shown in Fig. 1, the cans being received on the conveyor within the tank 8' and progressed therethrough for discharge into the atmosphere through the valve indicated at 15'. The construction has been shown more or less diagrammatically, as it is obvious that various modifications may be made in the constructional features without departing from the spirit of the invention.

What I claim is:

1. A combined cooker and cooler comprising a cooking retort and a cooling retort, the latter positioned beneath the former and communicating therewith by an open passage, the cooling retort having its discharge end remote from said passage and elevated above the main body of said cooling retort and means for supplying equal fluid pressure to the cooking retort and said elevated end of the cooling retort.

2. The structure specified in claim 1, with a discharge valve positioned at the elevated end of the cooling retort.

3. The structure specified in claim 1 with a discharge valve positioned in the elevated end of the cooling retort, means for progressing cans through the cooking retort to said passage intermediate the retort and means for conveying cans from said passage through the cooling retort to said discharge valve.

In testimony whereof I affix my signature.

NELSON H. FOOKS.